(12) United States Patent
Cheich et al.

(10) Patent No.: US 12,115,753 B2
(45) Date of Patent: Oct. 15, 2024

(54) DUNNAGE CONVERSION MACHINE FOR PRODUCING A DUNNAGE PAD HAVING SLIT-SHEET MATERIAL THEREIN

(71) Applicant: Ranpak Corp., Concord Township, OH (US)

(72) Inventors: Robert C. Cheich, Independence, OH (US); Dennis J. Wagner, Painesville, OH (US); Brian J. Stinard, Wickliffe, OH (US)

(73) Assignee: Ranpak Corp., Concord Township, OH (US)

( * ) Notice: Subject to any disclaimer, the term of this patent is extended or adjusted under 35 U.S.C. 154(b) by 203 days.

(21) Appl. No.: 17/905,986

(22) PCT Filed: Mar. 9, 2021

(86) PCT No.: PCT/US2021/021581
§ 371 (c)(1),
(2) Date: Sep. 9, 2022

(87) PCT Pub. No.: WO2021/183570
PCT Pub. Date: Sep. 16, 2021

(65) Prior Publication Data
US 2023/0094170 A1    Mar. 30, 2023

Related U.S. Application Data

(60) Provisional application No. 62/987,025, filed on Mar. 9, 2020.

(51) Int. Cl.
*B31D 5/00*    (2017.01)

(52) U.S. Cl.
CPC .... *B31D 5/0065* (2013.01); *B31D 2205/0047* (2013.01); *B31D 2205/0058* (2013.01); *B31D 2205/0064* (2013.01)

(58) Field of Classification Search
CPC .......... B31D 5/0065; B31D 2205/0058; B31D 2205/0064; B31D 2205/0047; Y02W 90/10
See application file for complete search history.

(56) References Cited

U.S. PATENT DOCUMENTS 5,667,871 A    9/1997  Goodrich et al.
5,688,578 A *  11/1997 Goodrich ............... B65D 81/05
                                                   428/184

(Continued)

FOREIGN PATENT DOCUMENTS

JP    2017537815 A    12/2017
WO    1996001731 A1    1/1996
WO    2017039792 A1    3/2017

OTHER PUBLICATIONS

International Preliminary Report on Patentability issued Sep. 6, 2022, for priority International Patent Application No. PCT/US2021/021581.

(Continued)

*Primary Examiner* — Thomas M Wittenschlaeger
(74) *Attorney, Agent, or Firm* — Renner, Otto, Boisselle & Sklar, LLP

(57) ABSTRACT

A dunnage conversion machine includes (i) a pair of gripping rollers configured to rotate at a first rotational speed to advance a slit-sheet material in a downstream direction; (ii) a pair of expansion rollers configured to rotate at a second rotational speed, faster than the first rotational speed, creating a stretching force on the slit-sheet material and further advancing the slit-sheet material, causing expansion of the slit-sheet material to a fully expanded state; and (iii) a pair of relaxation rollers configured to rotate at a third rotational speed, slower than the second rotational speed, reducing the stretching force and further advancing the slit-sheet material, allowing the slit-sheet material to relax to a partially (Continued)

expanded state. The pair of relaxation rollers (iii) also are configured to capture the slit-sheet material in the partially expanded state between a top cover sheet and a bottom cover sheet to form a dunnage pad.

20 Claims, 10 Drawing Sheets

(56) References Cited

U.S. PATENT DOCUMENTS 11,059,256 B2     7/2021   Cheich et al.
2019/0100369 A1    4/2019   Hoffman et al.

OTHER PUBLICATIONS

International Search Report and Written Opinion mailed May 31, 2021, for priority International Patent Application No. PCT/US2021/021581.

* cited by examiner

DUNNAGE CONVERSION MACHINE FOR PRODUCING A DUNNAGE PAD HAVING SLIT-SHEET MATERIAL THEREIN

This application is a national phase of International Patent Application No. PCT/US2021/021581, filed Mar. 9, 2021, and published in the English language; which claims priority to U.S. Provisional Patent Application No. 62/987,025, filed Mar. 9, 2020, each of which is hereby incorporated herein by reference in its entirety.

FIELD OF THE INVENTION

The present invention relates generally to the field of dunnage conversion systems and more particularly to a dunnage conversion machine and method of converting a supply of sheet material into a relatively flat dunnage pad.

BACKGROUND

In the process of packing an article in a packaging container for shipping the article from one location to another, a protective packaging material (dunnage product) is typically placed in the packaging container with the article. The dunnage product is included to fill any voids or to cushion the article during the shipping process. Paper packing material is an ecologically-friendly packing material that is recyclable, biodegradable, and composed of a renewable resource. While paper in sheet form could possibly be used as a protective packaging material, it may be preferable to convert the sheets of paper into a low-density dunnage product.

For example, expandable slit-sheet packing material, also referred to as slit-sheet material, slit-sheet stock material, die-cut sheet stock material, or slit material, is useful as a cushioning material for wrapping articles and as a void-fill material for packages. The slit-sheet stock material has a plurality of slits generally arrayed in parallel rows across a width dimension of the slit-sheet stock material, with the slits in each row offset from the slits in adjacent rows. When a stretching force is applied to this slit-sheet material in a length or longitudinal direction, the slit-sheet material expands in both length and thickness, while decreasing in width, to yield an increase in volume and comparable decrease in density. As used herein, the term expanding, therefore, refers to a three-dimensional expansion or a volume expansion. Such slit-sheet paper packing material, and the manufacturing thereof, are described in greater detail in U.S. Pat. Nos. 5,667,871 and 5,688,578, the disclosures of which are hereby incorporated herein by reference in their entireties.

SUMMARY

The present disclosure describes a dunnage conversion machine for producing a relatively flat dunnage pad having a slit-sheet material in a partially expanded state captured against a cover sheet or between a top cover sheet and a bottom cover sheet. Prior to being captured and fixed to the cover sheet to form the dunnage pad, slit-sheet material in an unexpanded state is expanded to a fully expanded state and stretched or tensioned to inelastically deform the slit-sheet material and yield an increase in volume and comparable decrease in density. If captured and fixed to one or more cover sheets in the fully expanded state, the fully expanded slit-sheet material tends to warp and twist such that the slit-sheet material does not lie flat. Accordingly, the resulting dunnage pad will not be relatively flat. The fully expanded slit-sheet material, therefore, is relaxed to a partially-expanded state prior to being captured and fixed to the cover sheet or cover sheets. In the partially expanded state or relaxed state, the slit-sheet material rests in a relatively flat configuration, while maintaining an increase in volume and comparable decrease in density compared to the slit-sheet material in the unexpanded state. Once the partially expanded slit-sheet material is captured and fixed to the cover sheet, the combination forms a relatively flat, or planar, dunnage pad having a thickness substantially defined by the thickness of the slit-sheet material in the partially expanded state. The dunnage pad may be used, for example, as an insulation or liner for a packaging box or bag.

Thus, an exemplary slit-sheet material has a plurality of rows of slits extending across a width dimension of the sheet with adjacent rows laterally offset, and an exemplary dunnage conversion machine for producing a dunnage pad from a slit-sheet material includes (1) means for advancing the slit-sheet material in an unexpanded state from a supply in a downstream direction transverse the width dimension at a first rate, (2) means for expanding the slit-sheet material downstream of the advancing means, the expanding means creating tension in the slit-sheet material transverse the width dimension downstream of the advancing means to cause the slits to open to a fully-expanded state; (3) means for reducing the tension in the slit-sheet material downstream of the expanding means to cause the slits to relax from the fully-expanded state to a partially-expanded state; and (4) means for connecting the slit-sheet material in the partially-expanded state to at least one cover sheet to form a dunnage pad.

An exemplary embodiment of the dunnage conversion machine described above further include means for separating a discrete length of the dunnage pad for use.

In one or more further embodiments of the dunnage conversion machine described above, a) the advancing means includes a pair of opposed gripping rollers configured to grip the slit-sheet material therebetween in an unexpanded state and to rotate at a first rotational speed to advance the slit sheet material in a downstream direction; b) the expanding means includes a pair of expansion rollers configured to engage the slit-sheet material and to rotate at a second rotational speed, the second rotational speed being faster than the first rotational speed to create a stretching force on the slit-sheet material in a region between the gripping rollers and the expansion rollers and to further advance the slit-sheet material in the downstream direction, wherein the stretching force causes expansion of the slit-sheet material to a fully expanded state; or c) the expanding means and the reducing means are provided by a pair of relaxation rollers downstream of the pair of expansion rollers, the pair of relaxation rollers being configured to engage the slit-sheet material and to rotate at a third rotational speed, the third rotational speed being slower than the second rotational speed to reduce the stretching force on the slit-sheet material in a region between the expansion rollers and the relaxation rollers and to further advance the slit-sheet material in the downstream direction, wherein the reduction of stretching force causes relaxation of the slit-sheet material to a partially expanded state, and wherein the pair of relaxation rollers are configured to capture the slit-sheet material in the partially expanded state against a cover sheet to form the dunnage pad Another exemplary dunnage conversion machine for producing a dunnage pad from a slit-sheet material includes (1) a pair of gripping rollers being configured to grip a slit-sheet material therebetween in an unexpanded state and to rotate at a first rotational speed to advance the slit-sheet material in a downstream direction transverse the width dimension; (2) a pair of expansion rollers downstream of the pair of gripping rollers, the pair of expansion rollers being configured to engage the slit-sheet material and to rotate at a second rotational speed, the second rotational speed being faster than the first rotational speed to create a stretching force on the slit-sheet material transverse the width dimension in a region between the gripping rollers and the expansion rollers and to further advance the slit-sheet material in the downstream direction, wherein the stretching force causes expansion of the slit-sheet material to a fully expanded state; and (3) a pair of relaxation rollers downstream of the pair of expansion rollers, the pair of relaxation rollers being configured to engage the slit-sheet material and to rotate at a third rotational speed, the third rotational speed being slower than the second rotational speed to reduce the stretching force on the slit-sheet material in a region between the expansion rollers and the relaxation rollers and to further advance the slit-sheet material in the downstream direction, wherein the reduction of stretching force causes relaxation of the slit-sheet material to a partially expanded state, and wherein the pair of relaxation rollers are configured to capture the slit-sheet material in the partially expanded state against a cover sheet to form the dunnage pad.

One or more embodiments of the dunnage conversion machine include a housing that supports the pair of gripping rollers, the pair of expansion rollers, and the pair of relaxation rollers. The housing may have an opening at an upstream end of the housing configured to receive the slit-sheet material in the unexpanded state from a supply of slit-sheet material, and a discharge outlet at a downstream end of the housing for delivering the formed dunnage pad.

In one or more embodiments of the dunnage conversion machine a) the pair of relaxation rollers are configured to receive a top cover sheet from a supply of top cover sheet material and a bottom cover sheet from a supply of bottom cover sheet material therebetween and on opposing sides of the partially-expanded slit-sheet material; b) the pair of relaxation rollers are configured to capture the slit-sheet material in the partially expanded state between the top cover sheet and the bottom cover sheet by fixing at least a portion of a periphery of the top cover sheet and at least a portion of a periphery of the bottom cover sheet to each other, with at least a portion of a periphery of the slit-sheet material in the partially expanded state being fixed therebetween; c) the at least a portion of the periphery of the top cover sheet and the at least a portion of the periphery of the bottom cover sheet each have a cohesive coating thereon and the relaxation rollers are configured to adhere the at least a portion of the periphery of the top cover sheet and the at least a portion of the periphery of the bottom cover sheet to each other by pressing the cohesive-coated portions together; d) the pair of relaxation rollers are configured to receive a separator sheet from a supply of separator sheet therebetween and between the slit-sheet material and at least one cover sheet; or e) the separator sheet has a width that is less than each of a width of the cover sheet and a width of the slit-sheet material in the partially expanded state.

One or more embodiments of the dunnage conversion machine include a cutting device mounted in the dunnage conversion machine downstream of the relaxation rollers, the cutting device being configured to cut the dunnage pad after a desired length has been formed.

An exemplary system producing a dunnage pad from a slit-sheet material includes the dunnage conversion machine as described above, a controller configured to maintain the first rotational speed, the second rotational speed, and the third rotational speed; and a supply of sheet stock material for delivery to the dunnage conversion machine and formation of the dunnage pad.

In one or more embodiments of the system, the supply of sheet stock material includes a supply of slit-sheet material for delivery of the slit-sheet material in the unexpanded state between the pair of gripping rollers, and a supply of cover sheet material for delivery of the cover sheet between the pair of relaxing rollers.

The supply of slit-sheet material and the supply of cover sheet material may be provided in the form of a roll, at least one of the slit-sheet material and the cover sheet material may be made of paper, or at least one of the slit-sheet material and the cover sheet material may be made of kraft paper.

An exemplary method for producing a dunnage pad from a slit-sheet material includes the following steps: (1) advancing the slit-sheet material in an unexpanded state from a supply in a downstream direction transverse the width dimension at a first rate; (2) creating tension in the slit-sheet material transverse the width dimension to cause the slits to open to a fully-expanded state; (3) reducing the tension in the slit-sheet material after the creating step to cause the slits to relax from the fully-expanded state to a partially-expanded state; and (4) connecting the slit-sheet material in the partially-expanded state to at least one cover sheet to form a dunnage pad.

In one or more embodiments of the method, the advancing step includes feeding the slit-sheet material in an unexpanded state between a pair of gripping rollers rotating at a first rotational speed to advance the slit-sheet material in a downstream direction, the creating step includes expanding the slit-sheet material to a fully expanded state by drawing the slit-sheet material between a pair of expansion rollers rotating at a second rotational speed, the second rotational speed being faster than the first rotational speed to create a stretching force on the slit-sheet material in a region between the gripping rollers and the expansion rollers and to further advance the slit-sheet material in the downstream direction as it expands to the fully expanded state; and the reducing step includes relaxing the slit-sheet material to a partially expanded state by drawing the slit-sheet material between a pair of relaxation rollers rotating at a third rotational speed, the third rotational speed being slower than the second rotational speed to reduce the stretching force on the slit-sheet material in a region between the expansion rollers and the relaxation rollers and to further advance the slit-sheet material in the downstream direction while the reduction of stretching force causes relaxation of the slit-sheet material to the partially expanded state. The connecting step may include capturing the slit-sheet material in the partially expanded state between a top cover sheet and a bottom cover sheet to form the dunnage pad.

One or more embodiments of the method may further include the step of cutting the dunnage pad after a desired length of dunnage pad has been formed.

DETAILED DESCRIPTION

An exemplary slit-sheet material has a plurality of rows of slits extending across a width dimension of the sheet with adjacent rows laterally offset, and an exemplary dunnage conversion machine for producing a dunnage pad from a slit-sheet material includes (1) means for advancing the slit-sheet material in an unexpanded state from a supply in a downstream direction transverse the width dimension at a first rate, (2) means for expanding the slit-sheet material downstream of the advancing means, the expanding means creating tension in the slit-sheet material transverse the width dimension downstream of the advancing means to cause the slits to open to a fully-expanded state; (3) means for reducing the tension in the slit-sheet material downstream of the expanding means to cause the slits to relax from the fully-expanded state to a partially-expanded state; and (4) means for connecting the slit-sheet material in the partially-expanded state to at least one cover sheet to form a dunnage pad that lays flat with decreased or eliminated curling problems.

Figure 1:
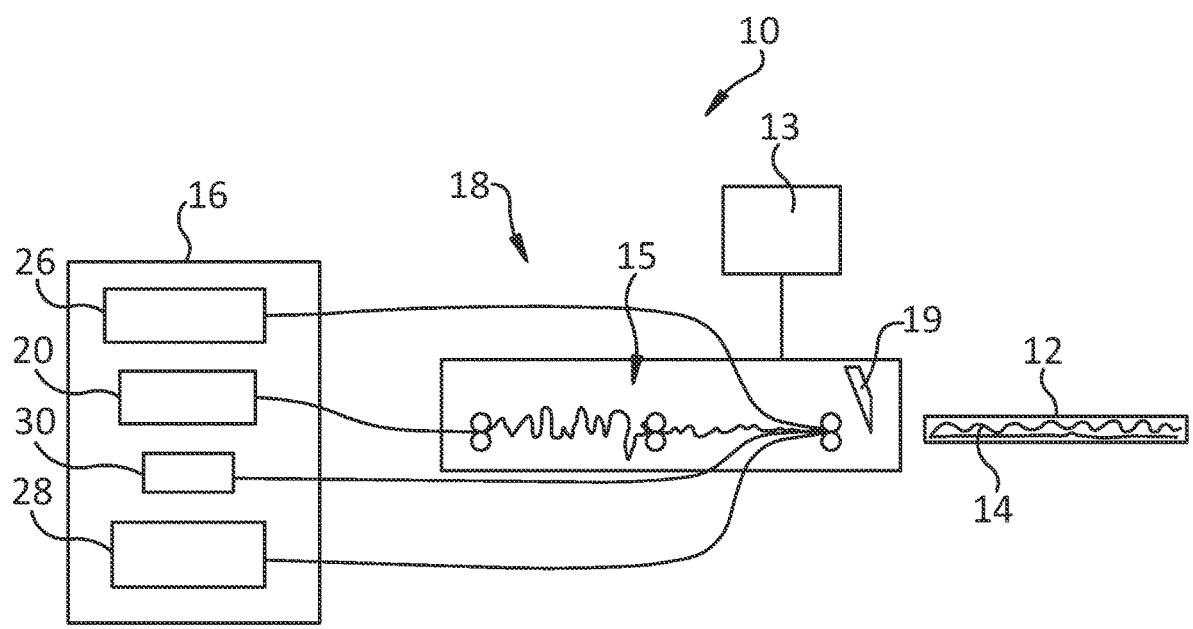
FIG. 1 is a schematic layout of a system for producing a dunnage pad having slit-sheet material in a partially expanded state therein.

Turning now to the drawings, and initially to FIG. 1, FIG. 1 shows a general schematic representation of an exemplary system 10 for producing a dunnage pad 12 having a slit-sheet material 14 in a partially expanded state. The system 10 includes a supply 16 of sheet stock material for delivery to a dunnage conversion machine 18. The dunnage conversion machine 18, which will be described in more detail with reference to FIG. 7, has a conversion assembly 15 that is configured to convert the supply 16 of sheet stock material into the resulting dunnage pad 12. The dunnage conversion machine 18 may include a cutting device 19 or other means for cutting or separating the dunnage pad 12 after a desired length of dunnage pad 12 has been formed by the conversion assembly 15. The system 10 also may include a controller 13 for controlling the operations of the dunnage conversion machine 18. The controller 13 may be a part of the dunnage conversion machine 18, itself, or may be provided separate from the dunnage conversion machine 18.

The supply of sheet stock material 16, which is delivered to and used by the dunnage conversion machine 18 to form the dunnage pad 12, includes a supply 20 of expandable, unexpanded slit-sheet material. That is, the slit-sheet material 14 in the supply 20 of expandable, unexpanded slit-sheet material is in an unexpanded state. The slit-sheet material 14 is expandable to a fully expanded state and thereafter relaxable to a partially expanded state, where it is captured between a top cover sheet provided by a supply 26 of top cover sheet and a bottom cover sheet provided by a supply 28 of bottom cover sheet.

The slit-sheet material 14, may include paper, such as kraft paper, and typically includes single-ply kraft paper. A suitable kraft paper may have various basis weights, such as twenty-pound or forty-pound, for example. The paper itself may be made of zero to 100% recycled material. In some embodiments, the slit-sheet material may be laminated or may include any other suitable material such as another paper, plastic sheets, metal foil, or any other combination thereof. In some embodiments, the slit-sheet material may not include paper.

Figure 2:
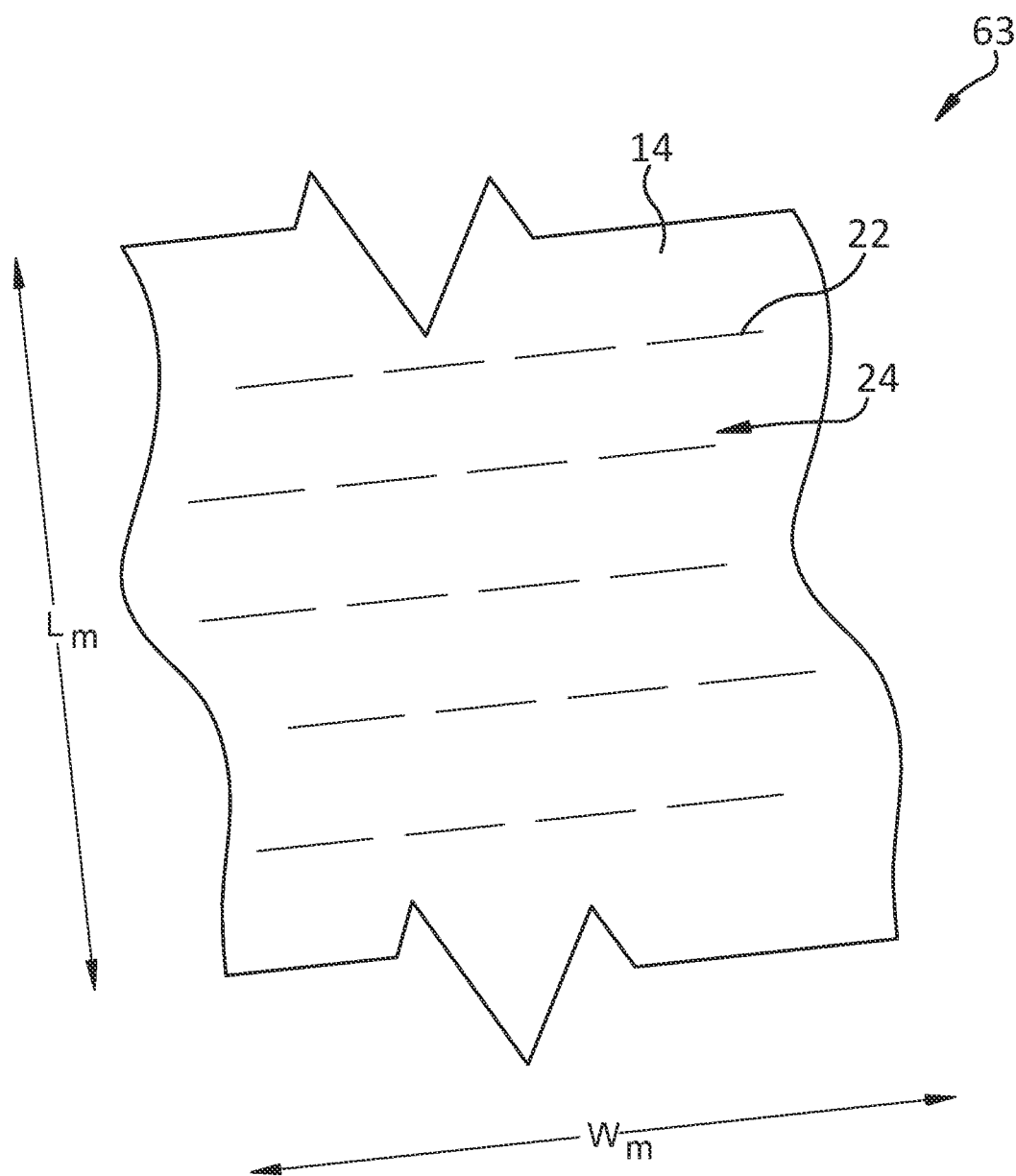
FIG. 2 is a perspective view of an exemplary slit-sheet material in an unexpanded state.

Referring to FIGS. 2-4B, an exemplary slit-sheet material 14, in various states of expansion, is depicted. FIG. 2 shows the slit-sheet material 14 in an unexpanded state 63, as it is supplied from the supply 20 of expandable, unexpanded slit-sheet material. The slit-sheet material 14 has a plurality of slits 22 arranged in a plurality of longitudinally-spaced (i.e., along a length $L_m$ of the slit-sheet material 14), transversely-extending (i.e., along a width $W_m$ of the slit-sheet material 14) rows 24 of slits 22. The slits 22 in each row 24 are generally offset along the width dimension from slits 22 in adjacent rows 24. The slit-sheet material 14 may have any of many alternative arrangements of slits 22 or differing sheet thickness (i.e., a dimension perpendicular to the face of the paper in the perspective shown in FIGS. 2, 3A, and 4A). Different arrangements of slits 22 may include any one or more of different arrangements of rows 24 relative to one another, differently-sized slits 22, different spacing between slits 22, different slit shape or slit positioning, such as angular positioning, relative to adjacent slits 22, etc. The slits 22 may be formed by perforating, such as by cutting, or otherwise weakening the slit-sheet material 14 intermittently across the width $W_m$ of the slit-sheet material 14.

The rows 24 of slits 22 generally are parallel to one another and are generally periodically, and typically equally, longitudinally-spaced from one another. The slits 22 are intermittently but periodically dispersed across the rows 24, with the slits 22 of each row 24 generally being staggered in relation to slits 22 of directly adjacent rows 24. Across each row 24 of slits 22, there may be a greater length of combined slit regions than a combined length of un-slit regions disposed between each slit 22, providing for an optimum amount of expansion of the slit-sheet stock material 14. The slit-sheet material 14 is configured to expand in one or more dimensions. In other words, when a stretching force (tension) is applied to the slit-sheet material 14 in the longitudinal direction, across the widthwise-extending slits 22, a volumetric expansion of the slit-sheet material 14 occurs.

Figure 3A:
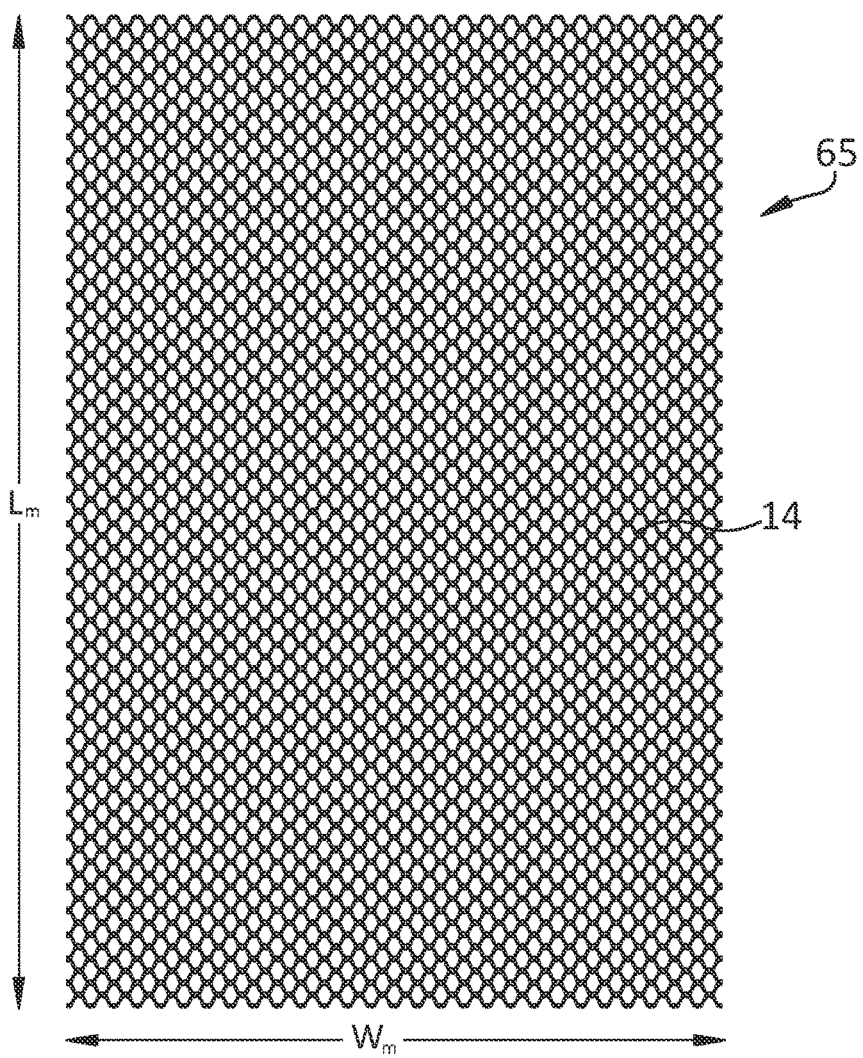
FIG. 3A is a perspective view of the exemplary slit-sheet material in a fully expanded state.
Figure 3B:
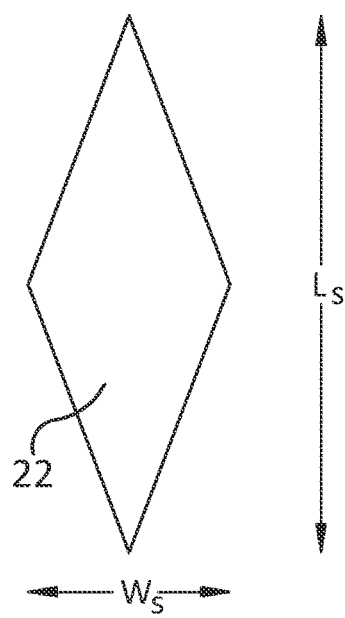
FIG. 3B is a schematic representation of a slit of the slit-sheet material in the fully expanded state.

FIG. 3A shows the slit-sheet material 14 in a fully expanded state 65 upon application of a stretching force in the longitudinal direction (i.e., along the length $L_m$ of the slit-sheet material 14). Upon application of the stretching force, the length $L_m$ of the slit-sheet material 14 increases, while the width $W_m$ decreases, compared to the slit-sheet material 14 in the unexpanded state 63. Specifically, when the stretching force is applied to the slit-sheet material 14 in the longitudinal direction, regions of the slit-sheet material 14 on either side of the slits 22 in the longitudinal direction are pulled apart from each other and the slits 22 are opened to a shape where a length $L_s$ of the slits 22 is greater than a width $W_s$ of the slits, as illustrated in FIG. 3B.

When the stretching force is applied to the slit-sheet material 14 in the longitudinal direction, portions of the slit-sheet material 14 between the slits 22 rotate relative to the previously linear plane of the slit-sheet material 14 in the unexpanded state 63. This causes the thickness of the slit-sheet material 14 also to increase, as the rotated regions of the slit-sheet material 14 extend, or protrude, beyond the previous linear plane of the slit-sheet material 14. The thickness of the slit-sheet material 14 in the fully expanded state 65 may therefore be greater than the thickness of the slit-sheet material 14 in the unexpanded state 63 by an order of magnitude, or more, when stretched in this manner.

Additionally, as the stretching force is applied to the slit-sheet material 14 in the longitudinal direction and the slit-sheet material 14 is expanded to the fully expanded state 65, the slit-sheet material 14 inelastically deforms. This inelastic deformation causes the slit-sheet material 14 to remain in an expanded state and decreases the tendency of the slit-sheet material 14 to return to its previous unexpanded state 63. In other words, the stretching force applied is sufficient to expand the slit-sheet material 14 past its elastic limit.

In the fully expanded state 65, due to the tension created on the slit-sheet material 14 from the stretching force, the slit-sheet material 14 is prone to warp, twist, and condense in various locations along the width $W_m$ of the slit-sheet material 14. Because of this, the slit-sheet material 14 in the fully expanded state 65 does not typically lie flat, as it previously did in the unexpanded state 63. And if the slit-sheet material 14 is fixed to another sheet in the fully expanded state 65, the resulting dunnage product also will warp or twist. Accordingly, to achieve a relatively flat, yet expanded slit-sheet material 14, the slit-sheet material may be relaxed to a partially expanded state 67 by reducing the stretching force that is applied to the slit-sheet material 14 after it has been stretched to the fully expanded state 65 before it is secured in a dunnage product.

Figure 4A:
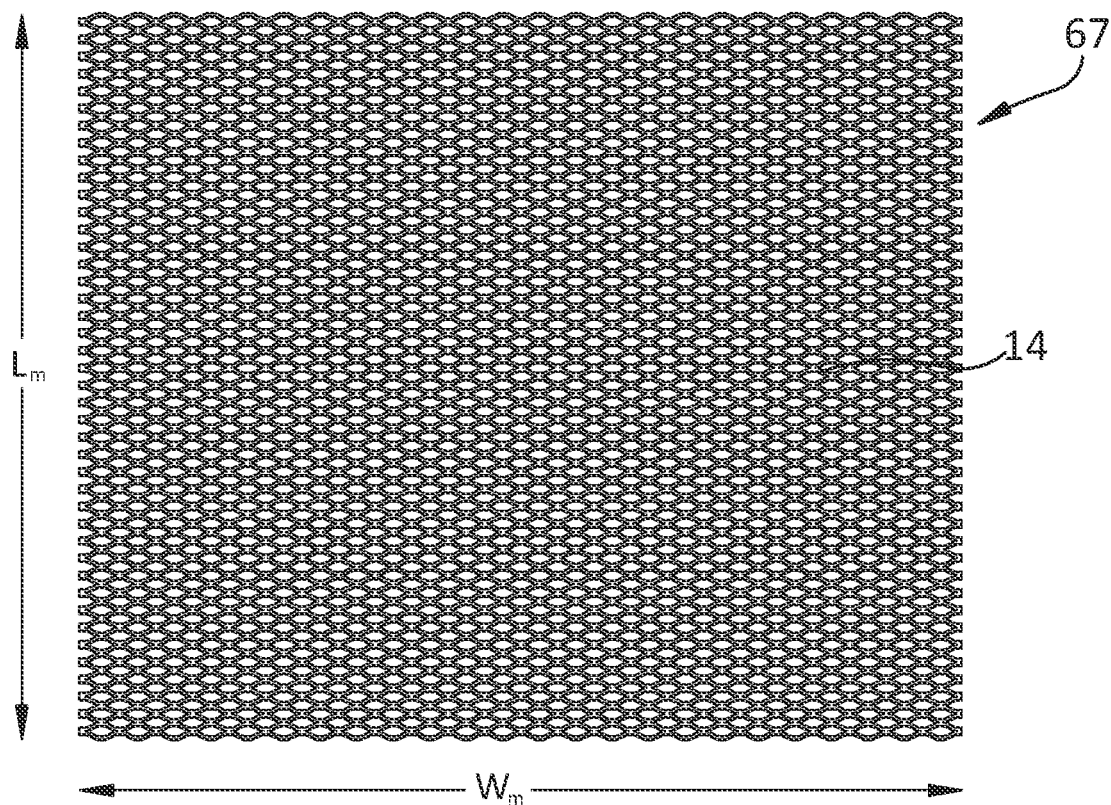
FIG. 4A is a perspective view of the exemplary slit-sheet material in a partially expanded state.
Figure 4B:
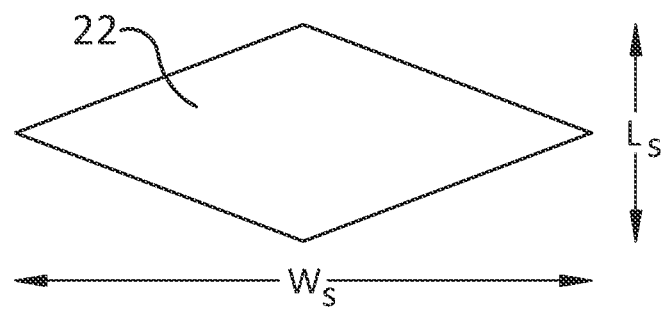
FIG. 4B is a schematic representation of a slit of the slit-sheet material in the partially expanded state.

FIG. 4A shows the slit-sheet material 14 in the partially expanded state 67 upon reduction of the stretching force in the longitudinal direction. Upon reduction of the stretching force, the length $L_m$ of the slit-sheet material 14 decreases, while the width $W_m$ increases, compared to the slit-sheet material 14 in the fully expanded state 65. Specifically, when the stretching force is reduced on the slit-sheet material 14 in the longitudinal direction, regions of the slit-sheet material 14 on either side of the slits 22 in the longitudinal direction are brought closer to each other such that the open slits 22 are partially closed to a shape that is longer in width $W_s$ than length $L_s$, as illustrated in FIG. 4B. Due to the inelastic deformation produced by stretching the slit-sheet material 14 to the fully expanded state 65, however, the relaxation of the slit-sheet material 14 from the fully expanded state 65 does not return the slit-sheet material 14 to the unexpanded state 63. Rather, the slit-sheet material 14 relaxes from the fully expanded state 65 to a partially expanded or relaxed state 67.

Figure 5:
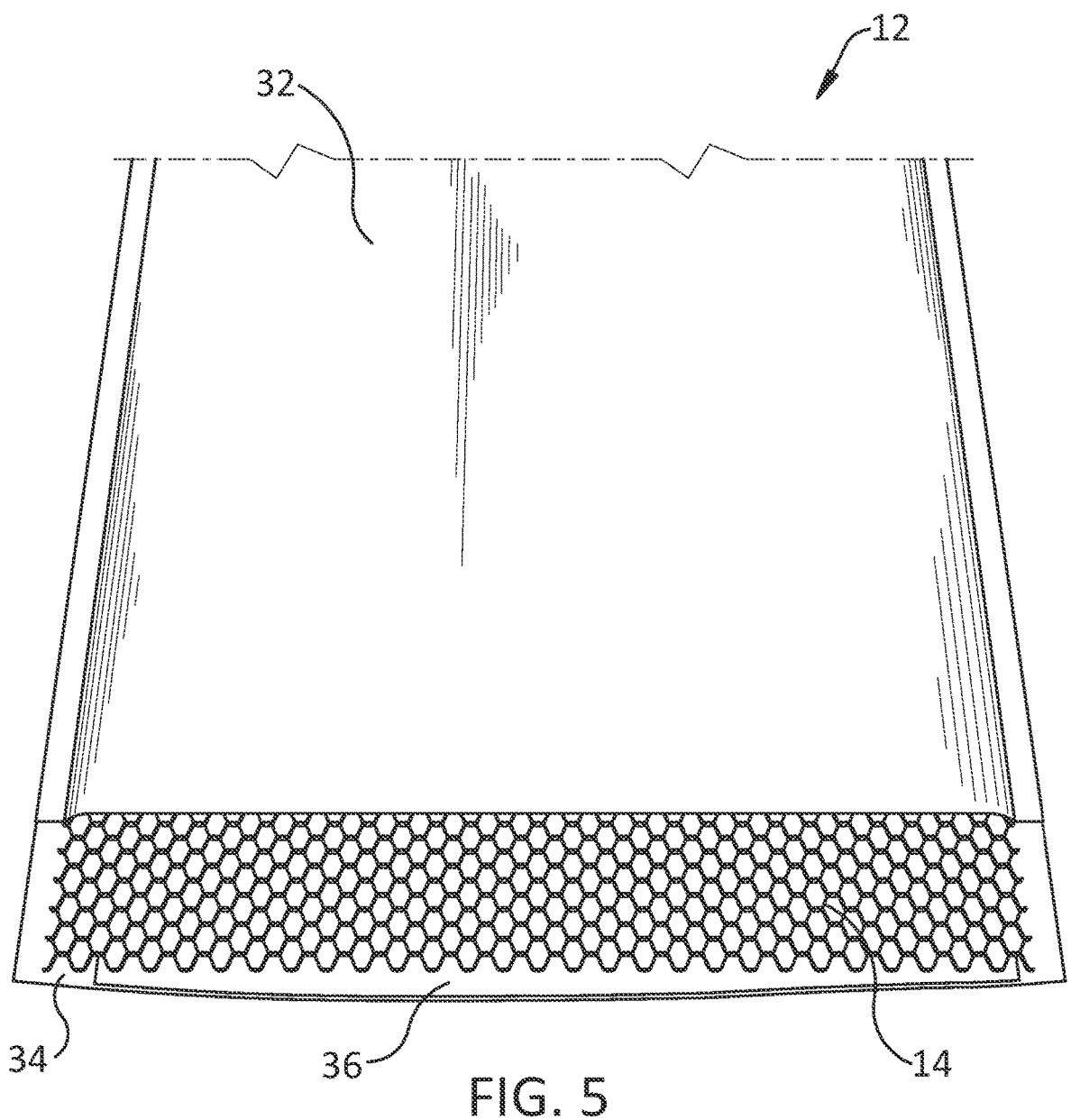
FIG. 5 is a perspective view of an exemplary dunnage pad.

Referring back to FIG. 1, the supply 16 of sheet stock material also may include a supply 26 of top cover sheet material and optionally a supply 28 of bottom cover sheet material for the dunnage pad 12. The supply 16 of sheet stock material also may include a supply 30 of separator sheet material. For example, an exemplary dunnage pad 12 is depicted in FIG. 5, formed with a top cover sheet 32 supplied from the supply 26 of top cover sheet material, the slit-sheet material 14 supplied from the supply 20 of slit-sheet material, a separator sheet 36 supplied from the supply 30 of separator sheet material, and a bottom cover sheet 34 supplied from the supply 28 of bottom cover sheet material. In another embodiment, the dunnage pad 12 may have more than one layer of slit-sheet material 14. The separator sheet 36 may be included to keep layers of the slit-sheet material 14 from nesting with each other to form a relatively thicker dunnage pad 12. Alternatively, or additionally, the separator sheet 36 may be included to provide additional insulation or cushioning in the formed dunnage pad 12, thereby retaining and enhancing the thermal, protective, and cushioning properties of the dunnage pad 12.

The top cover sheet 32, the bottom cover sheet 34, and the separator sheet 36 generally do not have any slits therein. Any one of the top cover sheet 32, the bottom cover sheet 34, and the separator sheet 36 may be any suitable sheet material such as paper (e.g., kraft paper, tissue paper, etc.), plastic sheets, metal foil, or any other combination thereof.

Figure 6A:
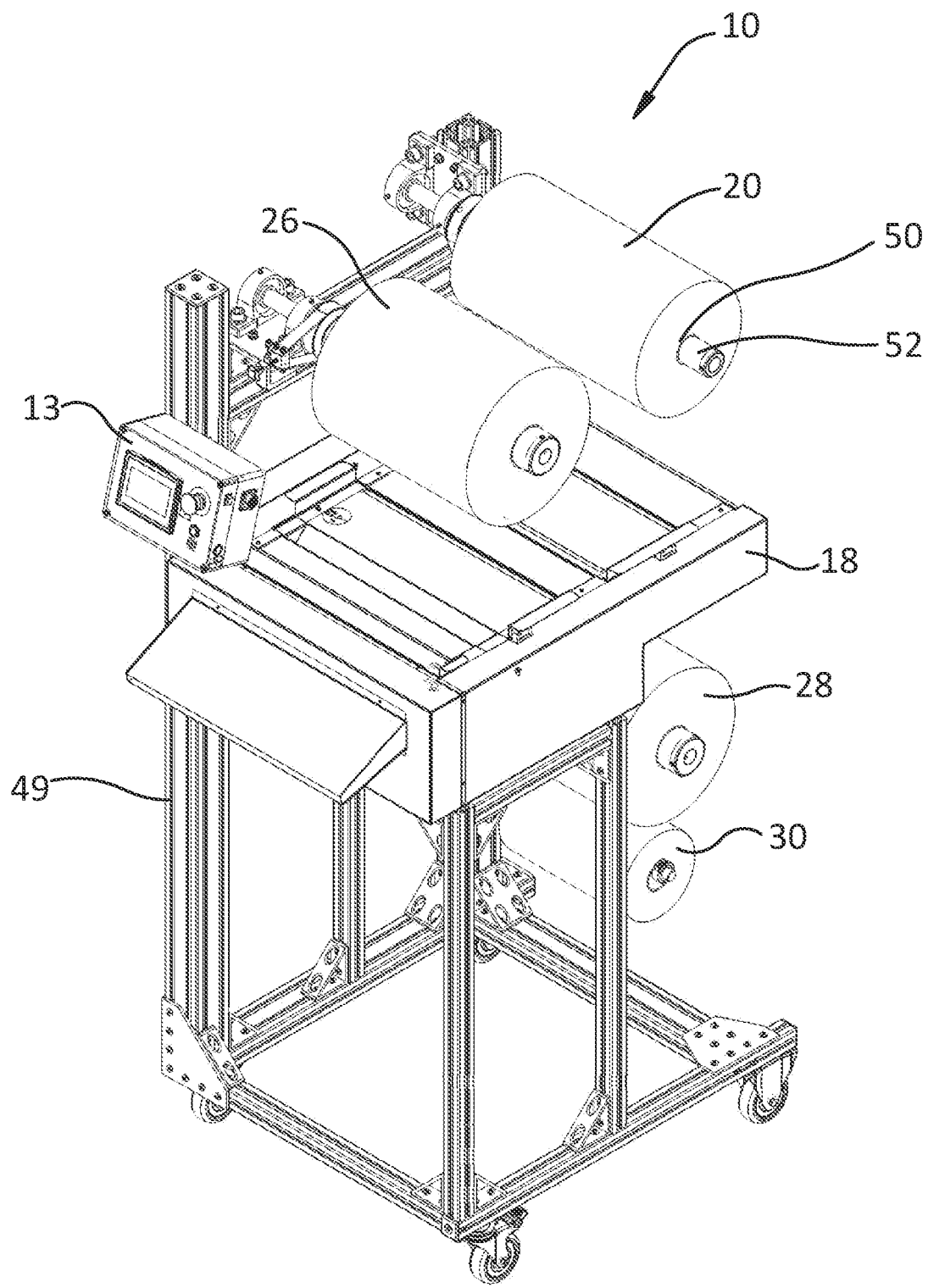
FIG. 6A is a perspective view of an exemplary system for producing a dunnage pad having a slit-sheet material therein.
Figure 6B:
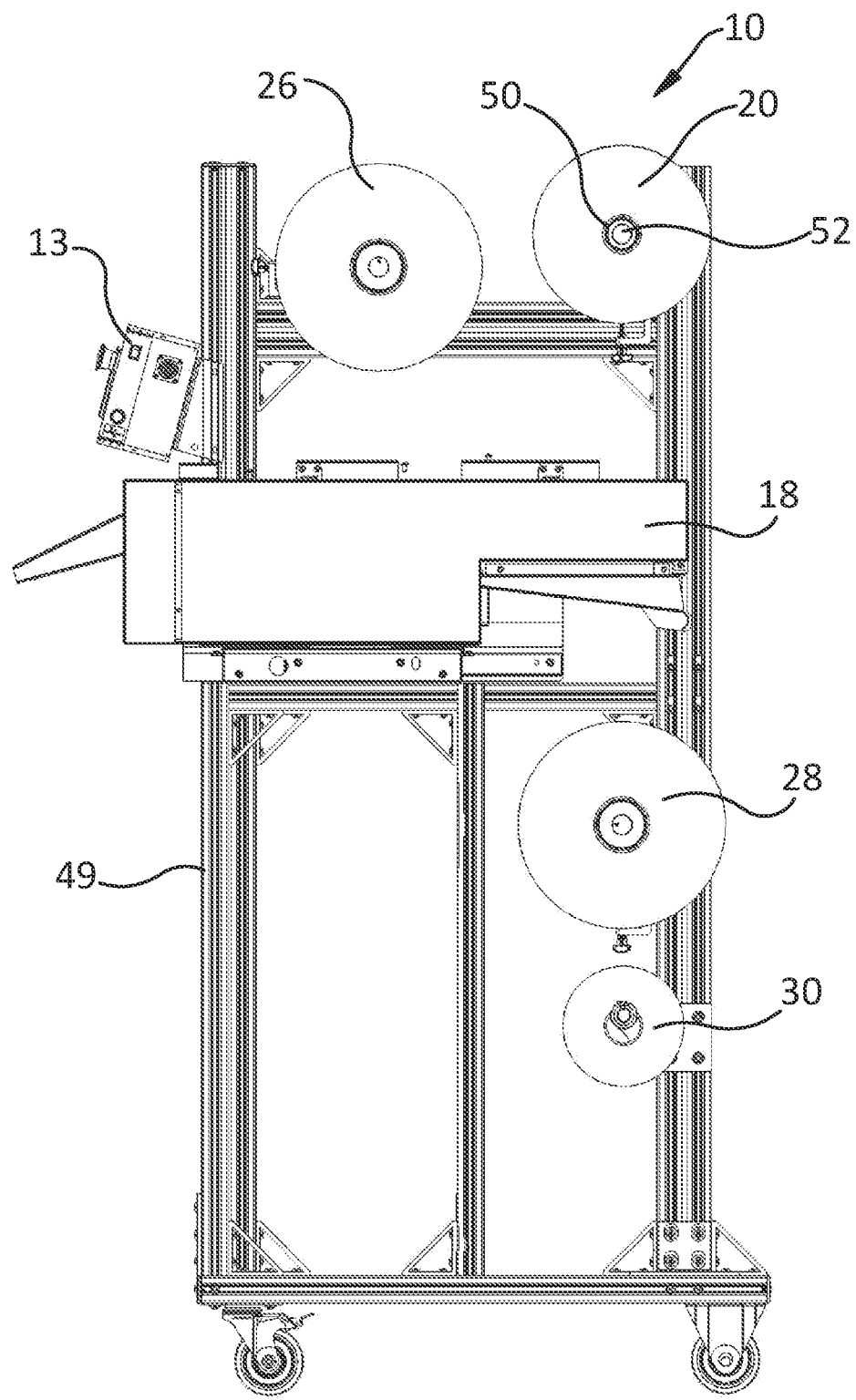
FIG. 6B is another perspective view of the exemplary system shown in FIG. 6A.

The respective supplies 20, 26, 28, and 30 of the system 10 may be provided in the form of rolls of their respective sheet stock materials 14, 32, 34, and 36. In an exemplary system 10 depicted in FIGS. 6A-B, the dunnage conversion machine 18 and the supplies 20, 26, 28, and 30 are mounted on a common frame 49. As shown, the supplies 20, 26, 28, and 30 are provided in the form of rolls of their respective sheet stock materials 14, 32, 34, and 36. In the illustrated embodiment, the respective sheet stock materials 14, 32, 34, and 36 are each separately wound about a hollow core (representatively shown at 50) that may be received on a spindle, shaft, or other supply support coupled to the frame (representatively shown at 52). In this arrangement, the sheet stock materials 14, 32, 34, and 36 may rotate about a central axis of their respective rolls, parallel to the width dimension of the respective sheet stock materials 14, 32, 34, and 36 as the sheet stock materials 14, 32, 34, and 36 are unwound from their respective rolls in a feed direction, transverse the central axis.

The hollow core 50 of each roll may be made of paperboard.

One or more of the rolls may include a resistance member operably connected to the hollow core 50 and fixed to the frame 49 to provide adjustable frictional resistance to the rolls as the sheet stock materials 14, 32, 34, and 36 are unwound therefrom. This frictional resistance prevents or reduces the degree to which the sheet stock materials 14, 32, 34, and 36 may overrun and continue to unwind from their respective roll when the conversion machine 18 stops, and ensures that a proper tension is applied as each sheet stock material 14, 32, 34, and 36 is drawn from its respective roll. Without this proper tension and resistance, the sheet stock materials 14, 32, 34, and 36 may unwind from their respective rolls in an uncontrolled and inconsistent manner, resulting in excess unwound sheet stock material 14, 32, 34, and 36 or tearing of the sheet stock material 14, 32, 34, and 36 that may interfere with the conversion process and decrease the quality of the resulting dunnage products.

Figure 6C:
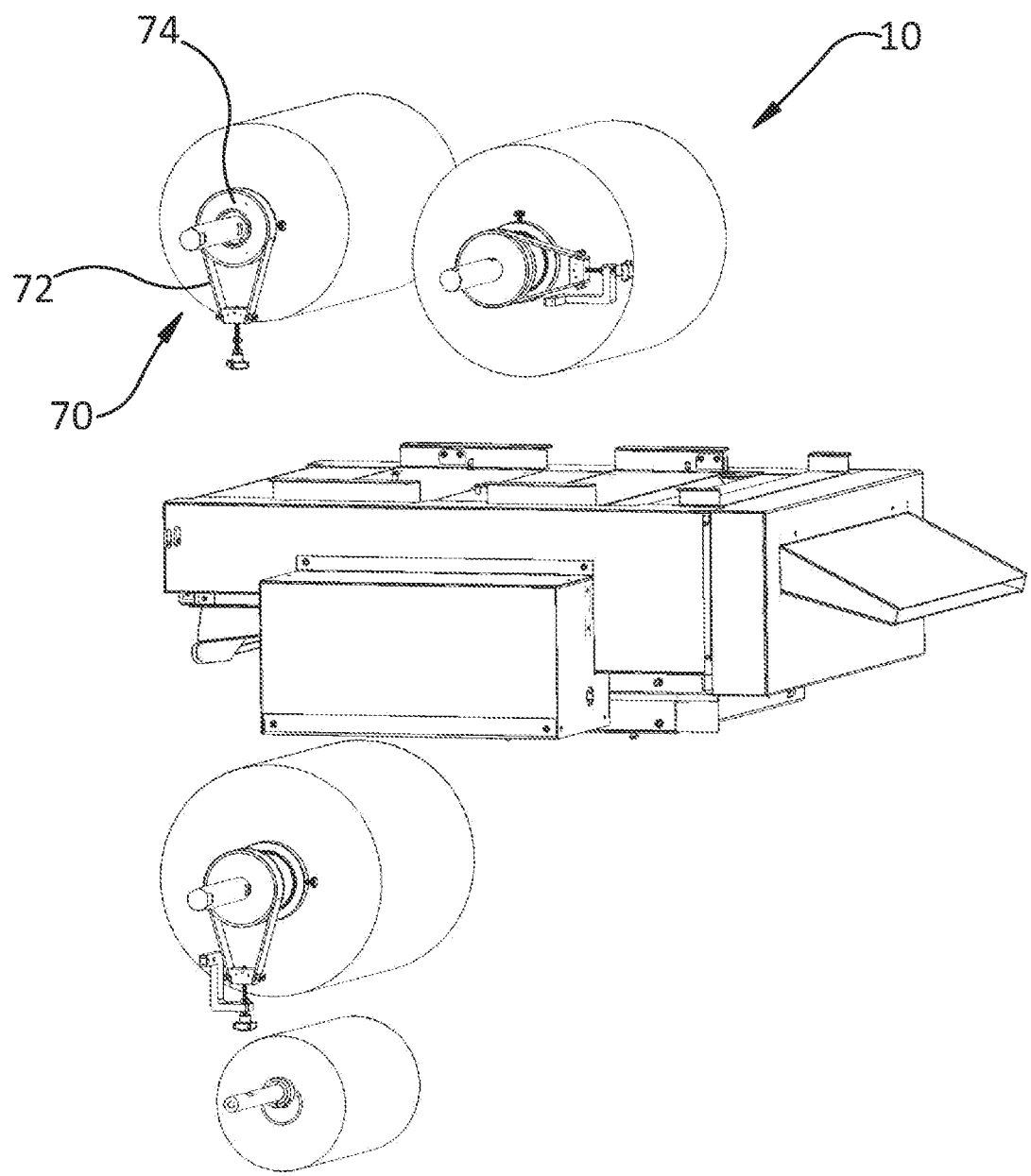
FIG. 6C is a perspective view of resistance members in the system of FIGS. 6A-B.

Exemplary resistance members are depicted in FIG. 6C (representatively shown at 70. In the illustrated embodiment, the resistance members 70 include a belt 72 that is fixed to the frame at one end (not shown) and wrapped around a belt holding member 74 that is fixed to the hollow core 50 of the rolls on the other end. The belt holding member 74 is fixed to the hollow core 50 of the rolls such that the belt holding member 74 is configured to rotate with the hollow core 50 as the respective sheet stock materials 14, 32, 34, and 36 are unwound from the rolls. As the belt holding member 74 rotates (as the sheet stock materials 14, 32, 34, and 36 are pulled or drawn from their respective rolls), friction is created between the belt 72 and the belt holding member 74, causing a resistance to the unwinding.

In other embodiments, the respective supplies 20, 26, 28, and 30 may be additionally or alternatively provided in another suitable arrangement, such as in a fan folded stack, where the respective sheet stock material 14, 32, 34, and 36 are alternatingly folded into a stack of generally rectangular pages.

Figure 7:
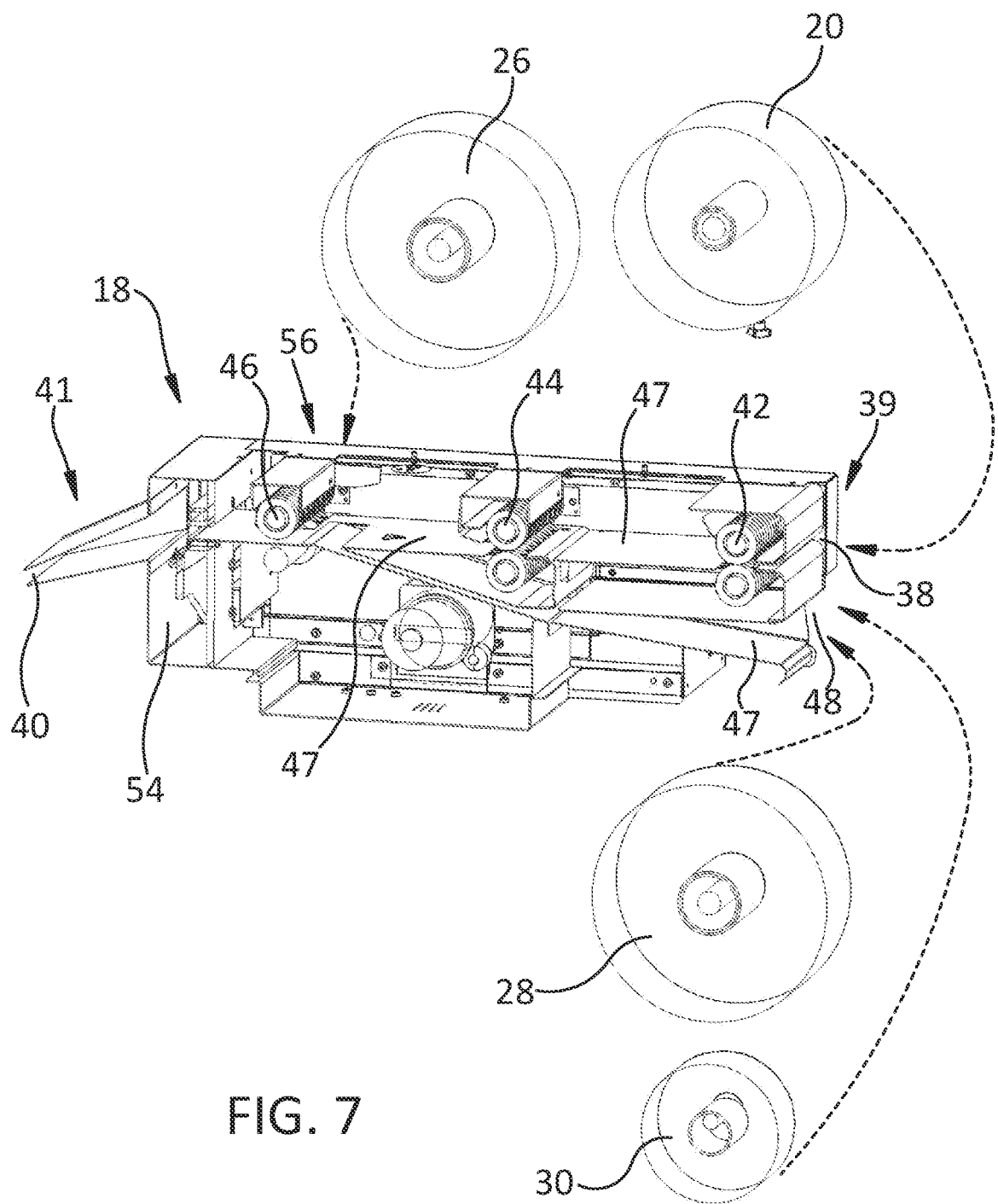
FIG. 7 is a cross-sectional perspective view of an exemplary dunnage conversion machine.

Now turning to FIG. 7, an exemplary dunnage conversion machine 18 will be described in more detail. FIG. 7 depicts the dunnage conversion machine 18 in cross-section, along with the supply 16 of sheet stock material. Specifically, in the illustrated embodiment, the supply 16 of sheet stock material includes the supply 20 of slit-sheet material, the supply 26 of top cover sheet material, the supply 28 of bottom cover sheet material, and the supply 30 of separator material, all provided in the previously described roll form.

The illustrated dunnage conversion machine 18 includes a housing 54 for the conversion assembly 15 and the cutting device 19. The conversion assembly 15 includes at least three pairs of rollers mounted in the housing 54. Each pair of rollers is configured to advance the slit-sheet material 14, and together they cooperate to advance the slit-sheet material 14 through the housing 54 from an upstream end 39 to a downstream end 41 (referred to herein as "the downstream direction"). Specifically, the rollers include a pair of gripping rollers 42, a pair of expansion rollers 44 mounted downstream of the pair of gripping rollers 42, and a pair of relaxation rollers 46 mounted downstream of the pair of expansion rollers 44. The pair of gripping rollers 42, the pair of expansion rollers 44, and the pair of relaxation rollers 46 may all be aligned in the same longitudinal plane, such that the slit-sheet material 14 may be advanced through the housing 54 in a linear fashion along its longitudinal direction. Downstream of the rollers 42, 44, and 46 in the conversion assembly 15, the cutting device 19 is mounted in the housing 54 for cutting the dunnage pad 12 after a desired length of dunnage pad 12 has been formed by the conversion assembly 15. The dunnage conversion machine 18 also may include within the housing 54 one or more guide members 47 mounted therein for supporting or guiding the slit-sheet material 14, the top cover sheet 32, the bottom cover sheet 34, and the separator sheet 36 as they are received and advanced through the conversion machine 18.

The paths upon which the slit-sheet material 14, the top cover sheet 32, the bottom cover sheet 34, and the separator sheet 36 follow, from their respective supplies 20, 26, 28, and 30 to the dunnage conversion machine 18, are depicted schematically in hashed, arrowed lines. Specifically, as depicted, the housing 54 may have a first or inlet opening 38 located at the upstream end 39 for receiving the slit-sheet material 14 from the supply 20 of slit-sheet material. The inlet opening 38 may be disposed immediately adjacent, and in the same linear plane as, the pair of gripping rollers 42 and on an upstream side of the pair of gripping rollers 42. After entering the housing 54 through the inlet opening 38, the slit-sheet material 14 is drawn between the pair of gripping rollers 42.

The housing 54 may additionally have a second opening 39 for receiving the bottom cover sheet 34 from the supply 28 of bottom cover sheet material and the separator sheet 36 from the supply 30 of separator sheet material. In the illustrated embodiment, the second opening also is located at the upstream end 39, adjacent and underneath the first opening 38. The second opening 39 may be located elsewhere on the housing 54, however, although typically upstream of the pair of relaxation rollers 46. In any embodiment, however, the second opening 48 is configured to receive the bottom cover sheet 34 and the separator sheet 36 from a location below where the first opening 38 receives the slit-sheet material 14, such that the bottom cover sheet 34 and the separator sheet 36 remain underneath the slit-sheet material 14 as the slit-sheet material 14 is advanced through the housing 54 in the downstream direction. Specifically, the bottom cover sheet 34 remains underneath the separator sheet 36, both of which remain underneath the slit-sheet material 14. After entering the housing 54 through the second opening 39, the bottom cover sheet 34 and the separator sheet 36 bypass both the pair of gripping rollers 42 and the pair of expansion rollers 44 and are instead directly received by the pair of relaxation rollers 46 and drawn therebetween, underneath the slit-sheet material 14.

The housing 54 also may include a third opening 56 for receiving the top cover sheet 32 from the supply 26 of top cover sheet material. In the illustrated embodiment, the third opening 56 is located on a top side of the housing 54, downstream of the gripping rollers 42 and the expansion rollers 44. The third opening 56 may be located elsewhere on the housing 54, however, although typically upstream of the pair of relaxation rollers 46. In any embodiment, the third opening 56 is configured to receive the top cover sheet 32 from a location above where the first opening 38 receives the slit-sheet material 14 such that the top cover sheet 32 remains above the slit-sheet material 14 as the slit-sheet material 14 is advanced through the housing 54 in the downstream direction. After entering the housing 54 through the third opening 56, the top cover sheet 32 also bypasses both the pair of gripping rollers 42 and the pair of expansion rollers 44 and is instead directly received by the pair of relaxation rollers 46 and drawn therebetween, above the slit-sheet material 14. The housing 54 also includes a discharge outlet 40 at a downstream end 41, downstream of the cutting device 19, for discharging the formed dunnage pad 12.

The configuration and operation of the gripping rollers 32, the expansion rollers 44, and the relaxation rollers 46 will now be described in more detail. The pair of gripping rollers 42 are mounted in the dunnage conversion machine 18 downstream of an upstream end 39 of the dunnage conversion machine 18 and the first opening 38 of the housing 54. The pair of gripping rollers 42 provide a means for advancing the slit-sheet material from the supply and are configured to receive the slit-sheet material 14 therebetween after the slit-sheet material 14 enters the first opening 38 of the housing 54 from the supply 20 of slit-sheet material. The pair of gripping rollers 42 are biased towards one another to provide a constant and equivalent gripping force across the lateral width $W_m$ of the slit-sheet material 14 passing therebetween. The pair of gripping rollers 42 are configured to grip the slit-sheet material 14 and to rotate at a first rotational speed, thereby advancing the slit-sheet material 14 in a downstream direction through the housing 54.

The gripping rollers 42 may be covered or otherwise formed with a friction material sufficient to grip the slit-sheet material 14 and advance the slit-sheet material 14 in the downstream direction at the first rotational speed as the pair of gripping rollers 42 rotate at the first rotational speed. The friction material may include shrink tubular material made of a heat shrinkable polymer, such as polyvinyl chloride. Alternatively, the friction material may include a rubber spray or painted coating. Additionally, the friction material may include vinyl tape or rubber. There is no theoretical upper limit to the amount of friction or grip caused by the friction material, except that damage to the slit-sheet material 14 should be avoided. Therefore, the use of an abrasive or coarse material is to be avoided.

The pair of expansion rollers 44 are mounted in the dunnage conversion machine 18 downstream of the pair of gripping rollers 42. The pair of expansion rollers 44 cooperate with the gripping rollers 42 to provide a means for expanding the slit-sheet material to its fully-expanded state, and are configured to receive the slit-sheet material 14 therebetween after the slit-sheet material 14 is advanced in the downstream direction from the pair of gripping rollers 42. The pair of expansion rollers 44 may be mounted in the housing in the same longitudinal plane as the pair of gripping rollers 42 in the upstream-downstream dimension, such that the slit-sheet material 14 may be advanced linearly, in its longitudinal direction, from the pair of gripping rollers 42 to the pair of expansion rollers 44.

The pair of expansion rollers 44 are configured to engage the slit-sheet material 14 and to rotate at a second rotational speed. The second rotational speed is faster than the first rotational speed. This difference in rotational speed between the gripping rollers 42 and the expansion rollers 44 creates tension, also referred to herein as a stretching force on the slit-sheet material 14 in a region between the gripping rollers 42 and the expansion rollers 44. The stretching force is sufficient to cause expansion of the slit-sheet material 14 from the unexpanded state 63 to the fully expanded state 65. The stretching force, therefore, causes the opening, or expansion, of the slits 22 of the slit-sheet material 14, as previously described. The stretching force also may be sufficient to cause inelastic deformation of the slit-sheet stock material 14 in the fully expanded state 65, but is not sufficient enough to tear the slit-sheet material 14.

Gripping means on the expansion rollers 44 may be provided to engage the slit-sheet material 14 without crushing the slit-sheet material 14 in the fully expanded state 65. The gripping means may be a plurality of moderately firm bristles uniformly distributed along the surface of at least one of the expansion rollers 44. The bristles have hook means on the outer end, the barb of the hook being oriented in the leading position so that the barbs engage the slits in the material during the rotation of the expansion rollers 44. Alternatively, the expansion rollers 44 may have respective portions spaced across one or more of the width and the circumference of the respective expansion rollers 44 to closely engage the expanded slit-sheet material 14 therebetween. These closely-engaging portions may crush and flatten localized portions of the expanded slit-sheet material, but do not alter the overall thickness of the slit-sheet material 14 in its fully expanded state 65 outside of the point of contact. The pair of expansion rollers 44 also is configured in one of these ways, or in another manner, to further advance the slit-sheet material 14 in the downstream direction to the relaxation rollers 46.

The pair of relaxation rollers 46 are mounted in the dunnage conversion machine 18 downstream of the pair of expansion rollers 44. The pair of relaxation rollers 46 cooperate with the expansion rollers 44 to provide means for reducing tension in the slit-sheet material and are configured to receive the slit-sheet material 14 therebetween after the slit-sheet material 14 is advanced in the downstream direction from the pair of expansion rollers 44. The pair of relaxation rollers 46 may be mounted in the same longitudinal plane as the pair of expansion rollers 44, such that the slit-sheet material 14 may be advanced linearly, in its longitudinal direction, from the pair of expansion rollers 44 to the pair of relaxation rollers 46.

The pair of relaxation rollers 46 are configured to engage the slit-sheet material 14 and to rotate at a third rotational speed. The third rotational speed is slower than the second rotational speed. This difference in rotational speed between the expansion rollers 44 and the relaxation rollers 46 reduces the stretching force on the slit-sheet material 14 in a region between the expansion rollers 44 and the relaxation rollers 46. This reduction in stretching force allows the slit-sheet material 14 to relax from the fully expanded state 65 to the partially expanded state 67. The reduction of stretching force, therefore, causes the partial closing, or relaxation, of the slits 22 of the slit-sheet material 14, as previously described.

Gripping means also may be provided on the relaxation rollers 46 to engage the slit-sheet material 14 without crushing the slit-sheet material in the partially expanded state 67 or with minimal crushing of the slit-sheet material 14. The gripping means may be the same as the gripping means previously described with reference to the expansion rollers 44. The pair of relaxation rollers 46 also is configured to further advance the slit-sheet material in the downstream direction.

The pair of relaxation rollers 46 also provide a means for connecting the slit-sheet material in the partially-expanded state to at least one cover sheet and in the illustrated embodiment are configured to capture the slit-sheet material 14 in the partially expanded state 67 between the top cover sheet 32 and the bottom cover sheet 34 to form the dunnage pad 12. Specifically, the pair of relaxation rollers 46 are configured to receive the top cover sheet 32 therebetween, above the slit-sheet material 14, and to receive the bottom cover sheet 34 therebetween, below the slit-sheet material 14 and secure at least the top cover sheet 32 and the bottom cover sheet 34 together, thereby capturing the slit-sheet material 14 in the partially expanded state 67 therebetween. Stated differently, the relaxation rollers 46 are configured to receive the top cover sheet 32 and the bottom cover sheet 36 therebetween and on opposing sides of the slit-sheet material 14, also received therebetween. In an embodiment in which the separator sheet 36 is supplied to the dunnage conversion machine 18, the relaxation rollers 46 also are configured to receive the separator sheet 36 therebetween and between the slit-sheet material 14 and at least one of the top cover sheet 32 and the bottom cover sheet 34 and to capture the separator sheet 36 therebetween.

At least one roller in at least one of the pair of gripping rollers 42, the pair of engaging rollers 44, and the pair of relaxation rollers 45 may have a substantially uniform radial thickness across an axial length of the respective roller. The substantially uniform radial thickness may include a plurality of portions of reduced radial thickness respectively disposed in laterally-spaced locations between respective ones of a plurality of regions of increased radial thickness. In another embodiment, at least one of the rollers in at least one of the pairs of respective rollers 42, 44, and 46 may include a variable radial thickness, including a single extended region of reduced radial thickness disposed between two end portions of the roller having an increased radial thickness.

In the illustrated embodiment, the pair of relaxation rollers 46 includes a top roller having a substantially uniform radial thickness along an axial length thereof, and a bottom roller including a variable radial thickness along an axial length thereof, the variable radial thickness having a single extended region of reduced radial thickness disposed between two end portions having an increased radial thickness. The top roller of the pair of relaxation rollers 46, having a substantially uniform radial thickness, serves to keep the top cover sheet 32 substantially flat and wrinkle-free while received between the pair of relaxation rollers 46. Additionally, in an embodiment in which no top cover sheet 32 is provided, the top roller of the pair of relaxation rollers 46 helps prevent the slit-sheet material 14 from jamming in the conversion assembly 15 in a region of the pair of relaxation rollers 46 as it is advanced in between the pair of relaxation rollers 46. This is because the top roller of the pair of relaxation rollers 46 pulls the slit-sheet material 14 in a substantially flat and controlled manner in between the pair of relaxation rollers 46. The bottom roller of the pair of relaxation rollers 46 engages the sheet material only at the end portions having an increased radial thickness so as not to crush the slit-sheet material 14 in the expanded state against the top roller.

The pair of relaxation rollers 46 may be configured to capture the slit-sheet material 14 in the partially expanded state between the top cover sheet 32 and the bottom cover sheet 34 by fixing, such as by adhering, at least a portion of a periphery of the top cover sheet 32 and at least a portion of a periphery of the bottom cover sheet 34 to each other. The fixing may alternatively include stitching, press-fitting, or any other suitable form of securing sheets together. At least a portion of a periphery of the slit-sheet material 14 in the partially expanded state may be fixed therebetween. In the embodiment in which the separator sheet 36 is supplied, the separator sheet 36 may lie in between the slit-sheet material 14 and at least one of the top cover sheet 32 and the bottom cover sheet 34, without being fixed or adhered thereto. The separator sheet 36 may have a width that is less than each of a width of the top cover sheet 32, a width of the bottom cover sheet 34, and a width of the slit-sheet material 14 in the partially expanded state 67. In another embodiment, however, the separator sheet 36 also may be fixed between the slit-sheet material 14 and at least one of the top cover sheet 32 and the bottom cover sheet 34.

To capture the slit-sheet material 14 in its relaxed or partially expanded state 67 between the top cover sheet 32 and the bottom cover sheet 34, respective portions of the top cover sheet 32 and bottom cover sheet 34 may each have a cohesive coating thereon, typically on a portion of the periphery of each. For example, each of the top cover sheet 32 and the bottom cover sheet 34 may have a cohesive coating along narrow longitudinally-extending strip portions on a common surface of laterally-outer edges of each of the top cover sheet 32 and the bottom cover sheet 34. The supply 26 of the top cover sheet material and the supply 28 of the bottom cover sheet material are configured to cooperate with the dunnage conversion machine 18 to direct the cohesive-coated surfaces of the top cover sheet 32 and the bottom cover sheet 34 to face each other before entering the relaxation rollers 46. In this embodiment, the relaxation rollers 46 also are configured to adhere the portion of the periphery of the top cover sheet 32 having the cohesive coating and the portion of the periphery of the bottom cover sheet 34 having the cohesive coating thereon to each other by pressing the respective portions together such that the cohesive-coated portions adhere to one another. This includes adhering cohesive-coated portions together that engage one another through the opened slits 22 to fix the slit-sheet material 14 to the top cover sheet 32 and the bottom cover sheet 34.

At least one of each of the pairs of rollers 42, 44, and 46 is driven by a motor. A common motor may be employed to drive all of the rollers 42, 44, and 46, or one or more sets of rollers 42, 44, and 46 may be separately driven by another motor. The relative speeds of the respective pairs of rollers 42, 44, and 46 may be set by an appropriate configuration of drive elements, such as gears and chains, or the speeds may be set electronically via the controller 13. The controller 13 also may control the starting and stopping of the rollers 42, 44, and 46, so as to produce a controlled length of dunnage, for example, and also may control operation of the cutting device 19.

The speed at which the pairs of rollers 42, 44, and 46 each rotate affects the elasticity and permanence of deformation of the slit-sheet material 14 as it is stretched from the unexpanded state to the fully expanded state. For example, a slower speed of rotation of the pairs of rollers 42, 44, and 46 will result in a more elastic deformation than a faster speed of rotation of the pairs of rollers 42, 44, and 46, which will result in a more inelastic deformation. A slower speed of rotation of the pairs of rollers 42, 44, and 46, therefore, may require less relaxation by the pair of relaxation rollers 46, as the slit-sheet material 14 may relax, at least partially, by elastic return.

The controller 13 may control the starting and stopping of the rollers 42, 44, and 46 intermittently such that a user may fold the formed dunnage pad into a desired configuration as it is intermittently discharged from the discharge outlet. For example, the controller 13 may cause the pairs of rollers 42, 44, and 46 to produce a first predetermined length of dunnage pad, then cause the pairs of rollers 42, 44, and 46 to stop. When stopped, the user may fold the pad, such as by creasing the pad over the discharge outlet. The controller 13 may then cause the pairs of rollers 42, 44, and 46 to produce a second predetermined length of dunnage pad before causing the pairs of rollers 42, 44, and 46 to stop again. When stopped again, the user again may fold the pad, as before. The controller 13 may control the starting and stopping of the rollers 42, 44, and 46 in this manner until a desired length and configuration, such as a rectangular configuration, of the dunnage pad is formed. The cutter is configured to cut the pad after the desired configuration and length of dunnage pad is produced.

Figure 8:
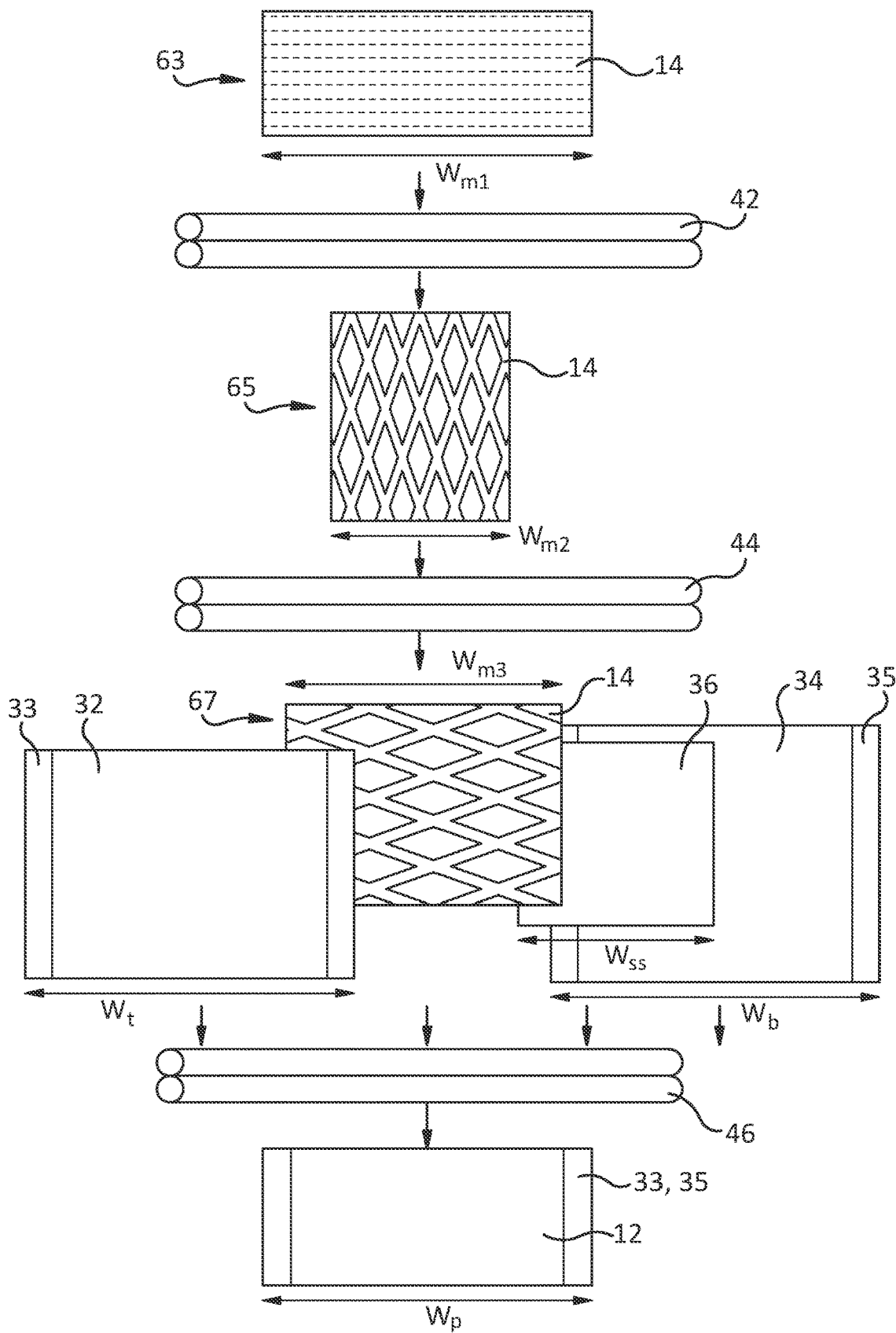
FIG. 8 is a schematic layout of a method for producing a dunnage pad having a slit-sheet material in a partially expanded state therein.

An exemplary method for producing the dunnage pad 12 having the slit-sheet material 14 in the partially expanded state therein, using the dunnage conversion machine 18 previously described, will now be described with reference to FIG. 8. The method includes the step of feeding the slit-sheet material 14 in the unexpanded state 63 between the pair of gripping rollers 42. As previously mentioned, the pair of gripping rollers 42 are configured to grip the slit-sheet material 14 and to rotate at the first rotational speed to advance the slit-sheet material in the downstream direction. As depicted in FIG. 8, the slit-sheet material 14 in the unexpanded state 63 has a first width $W_{m1}$.

The method also includes the step of expanding the slit-sheet material 14 to a fully expanded state 65 by drawing the slit-sheet material 14 between the pair of expansion rollers 44. As previously mentioned, the expansion rollers 44 are configured to engage the slit-sheet material 14 and to rotate at the second rotational speed. The second rotational speed is faster than the first rotational speed to create a stretching force on the slit-sheet material in the region between the gripping rollers 42 and the expansion rollers 44 and to further advance the slit-sheet material 14 in the downstream direction. The stretching force causes expansion of the slit-sheet material to the fully expanded state 65. As depicted in FIG. 8, the slit-sheet material 14 in the fully expanded state 65 has a second width $W_{m2}$.

The method then includes the step of relaxing the slit-sheet material 14 to the partially expanded state 67 by drawing the slit-sheet material 14 between the pair of relaxation rollers 46. As previously mentioned, the relaxation rollers 46 are configured to engage the slit-sheet material 14 and to rotate at the third rotational speed. The third rotational speed is slower than the second rotational speed to reduce the stretching force on the slit-sheet material 14 in the region between the expansion rollers 44 and the relaxation rollers 46 and to further advance the slit-sheet material 14 in the downstream direction. The reduction of stretching force causes relaxation of the slit-sheet material 14 to the partially expanded state 67. As depicted in FIG. 8, the slit-sheet material 14 in the partially expanded state 67 has a third width $W_{m3}$. The first width $W_{m1}$ is greater than the third width $W_{m3}$ which is greater than the second width $W_{m2}$. In other words, the slit-sheet material 14 in the unexpanded state 63 has a width that is greater than the slit-sheet material 14 in both the fully expanded state 65 and the partially expanded state 67. The slit-sheet material 14 in the partially expanded state 67 has a width that is greater than the slit-sheet material 14 in the fully expanded state 65.

The method also includes the step of fixing the slit-sheet material 14 in the partially expanded state 67 between the top cover sheet 32 and the bottom cover sheet 34 to form the dunnage pad 12.

The step of fixing the slit-sheet material 14 in the partially expanded state 67 between the top cover sheet 32 and the bottom cover sheet 34 may include the steps of feeding the top cover sheet 32 and the bottom cover sheet 34 between the pair of relaxation rollers 46 on opposing sides of the slit-sheet material 14, as previously described and depicted in FIG. 8. The method may additionally include feeding the separator material 30 between the pair of relaxation rollers 46 between the slit-sheet material 14 and at least one of the top cover sheet 32 and the bottom cover sheet 34. In the embodiment depicted in FIG. 8, for example, the separator sheet 36 is fed between the pair of relaxation rollers 46 between the slit-sheet material 14 and the bottom cover sheet 34.

The step of fixing may include adhering at least a portion 33 of a periphery of the top cover sheet 32 and at least a portion 35 of a periphery of the bottom cover sheet 34 to each other, with at least a portion of a periphery of the slit-sheet material 14 in the partially expanded state being fixed therebetween. In the illustrated embodiment, the separator sheet 30 has a width $W_{ss}$ that is less than each of a width $W_t$ of the top cover sheet 32, a width $W_b$ of the bottom cover sheet 34, and the third width $W_{m3}$ of the slit-sheet material 14 in the partially expanded sheet. Accordingly, in the illustrated embodiment, the separator sheet 36 lies between the slit-sheet material 14 and at least one of the top cover sheet 32 and the bottom cover sheet 34, without being fixed or adhered thereto.

To accomplish the fixing step, the portion 33 of the periphery of the top cover sheet 32 and the portion 35 of the periphery of the bottom cover sheet 34 may include a cohesive coating thereon. The step of adhering therefore may be accomplished by pressing the cohesive-coated surfaces on each portion 33, 35 together to form the dunnage pad 12. The width $W_p$ of the dunnage pad 12 is therefore the same as the width $W_t$ of the top cover sheet 32 and the width $W_b$ of the bottom cover sheet 34, as depicted in FIG. 8. The method may include the step of cutting the dunnage pad 12 after a desired length of dunnage pad 12 has been formed. Prior to cutting the dunnage pad 12, the method additionally may include one or more steps of folding the formed dunnage pad after one or more respective predetermined lengths of dunnage pad 14 have been formed to create a desired configuration of the formed dunnage pad.

In summary, an exemplary dunnage conversion machine 18 includes (i) a pair of gripping rollers 42 configured to rotate at a first rotational speed to advance a slit-sheet material 14 in a downstream direction; (ii) a pair of expansion rollers 44 configured to rotate at a second rotational speed, faster than the first rotational speed, creating a stretching force on the slit-sheet material 14 and further advancing the slit-sheet material 14, causing expansion of the slit-sheet material to a fully expanded state 65; and (iii) a pair of relaxation rollers 46 configured to rotate at a third rotational speed, slower than the second rotational speed, reducing the stretching force and further advancing the slit-sheet material 14, allowing the slit-sheet material 14 to relax to a partially expanded state 67. The pair of relaxation rollers 46 (iii) also are configured to fix the slit-sheet material 14 in the partially expanded state 67 between a top cover sheet 32 and a bottom cover 34 sheet to form a dunnage pad 12.

Although the invention defined by the following claims has been shown and described with respect to a certain embodiment, equivalent alternations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiments of the invention. In addition, while a particular feature of the invention may have been described above with respect to only one of several illustrated embodiments, such feature may be combined with one or more other features of the other embodiments, as may be desired and advantageous for any given or particular application.

We claim:

1. A dunnage conversion machine for producing a dunnage pad from a slit-sheet material having a plurality of rows of slits extending across a width dimension of the sheet with adjacent rows laterally offset, the dunnage conversion machine comprising:
    means for advancing the slit-sheet material in an unexpanded state from a supply in a downstream direction transverse the width dimension at a first rate;
    means for expanding the slit-sheet material downstream of the advancing means, the expanding means creating tension in the slit-sheet material transverse the width dimension downstream of the advancing means to cause the slits to open to a fully-expanded state; and
    means for reducing the tension in the slit-sheet material downstream of the expanding means to cause the slits to relax from the fully-expanded state to a partially-expanded state, and
    for connecting the slit-sheet material in the partially-expanded state to at least one cover sheet to form a dunnage pad.

2. A dunnage conversion machine as set forth in claim 1, further comprising means for separating a discrete length of the dunnage pad for use.

3. A dunnage conversion machine as set forth in claim 1, wherein the advancing means includes a pair of opposed gripping rollers configured to grip the slit-sheet material therebetween in an unexpanded state and to rotate at a first rotational speed to advance the slit sheet material in a downstream direction.

4. A dunnage conversion machine as set forth in claim 3, wherein the expanding means includes a pair of expansion rollers configured to engage the slit-sheet material and to rotate at a second rotational speed, the second rotational speed being faster than the first rotational speed to create a stretching force on the slit-sheet material in a region between the gripping rollers and the expansion rollers and to further advance the slit-sheet material in the downstream direction, wherein the stretching force causes expansion of the slit-sheet material to a fully expanded state.

5. A dunnage conversion machine as set forth in claim 4, wherein the expanding means and the reducing means are provided by a pair of relaxation rollers downstream of the pair of expansion rollers, the pair of relaxation rollers being configured to engage the slit-sheet material and to rotate at a third rotational speed, the third rotational speed being slower than the second rotational speed to reduce the stretching force on the slit-sheet material in a region between the expansion rollers and the relaxation rollers and to further advance the slit-sheet material in the downstream direction, wherein the reduction of stretching force causes relaxation of the slit-sheet material to a partially expanded state, and wherein the pair of relaxation rollers are configured to capture the slit-sheet material in the partially expanded state against a cover sheet to form the dunnage pad.

6. A dunnage conversion machine for producing a dunnage pad from a slit-sheet material having a plurality of rows of slits extending across a width dimension of the sheet with adjacent rows laterally offset, the dunnage conversion machine comprising:
    a pair of gripping rollers being configured to grip a slit-sheet material therebetween in an unexpanded state and to rotate at a first rotational speed to advance the slit-sheet material in a downstream direction transverse the width dimension;
    a pair of expansion rollers downstream of the pair of gripping rollers, the pair of expansion rollers being configured to engage the slit-sheet material and to rotate at a second rotational speed, the second rotational speed being faster than the first rotational speed to create a stretching force on the slit-sheet material transverse the width dimension in a region between the gripping rollers and the expansion rollers and to further advance the slit-sheet material in the downstream direction, wherein the stretching force causes expansion of the slit-sheet material to a fully expanded state; and
    a pair of relaxation rollers downstream of the pair of expansion rollers, the pair of relaxation rollers being configured to engage the slit-sheet material and to rotate at a third rotational speed, the third rotational speed being slower than the second rotational speed to reduce the stretching force on the slit-sheet material in a region between the expansion rollers and the relaxation rollers and to further advance the slit-sheet material in the downstream direction, wherein the reduction of stretching force causes relaxation of the slit-sheet material to a partially expanded state, and wherein the pair of relaxation rollers are configured to capture the slit-sheet material in the partially expanded state against a cover sheet to form the dunnage pad.

7. The dunnage conversion machine according to claim 6, further comprising:
    a housing that supports the pair of gripping rollers, the pair of expansion rollers, and the pair of relaxation rollers;
    an opening at an upstream end of the housing configured to receive the slit-sheet material in the unexpanded state from a supply of slit-sheet material; and
    a discharge outlet at a downstream end of the housing for delivering the formed dunnage pad.

8. The dunnage conversion machine according to claim 6, wherein the pair of relaxation rollers are configured to receive a top cover sheet from a supply of top cover sheet material and a bottom cover sheet from a supply of bottom cover sheet material therebetween and on opposing sides of the partially-expanded slit-sheet material.

9. The dunnage conversion machine according to claim 8, wherein the pair of relaxation rollers are configured to capture the slit-sheet material in the partially expanded state between the top cover sheet and the bottom cover sheet by fixing at least a portion of a periphery of the top cover sheet and at least a portion of a periphery of the bottom cover sheet to each other, with at least a portion of a periphery of the slit-sheet material in the partially expanded state being fixed therebetween.

10. The dunnage conversion machine according to claim 9, wherein the at least a portion of the periphery of the top cover sheet and the at least a portion of the periphery of the bottom cover sheet each have a cohesive coating thereon and the relaxation rollers are configured to adhere the at least a portion of the periphery of the top cover sheet and the at least a portion of the periphery of the bottom cover sheet to each other by pressing the cohesive-coated portions together.

11. The dunnage conversion machine according to claim 6, wherein the pair of relaxation rollers are configured to receive a separator sheet from a supply of separator sheet therebetween and between the slit-sheet material and at least one cover sheet.

12. The dunnage conversion machine according to claim 11, wherein the separator sheet has a width that is less than each of a width of the cover sheet and a width of the slit-sheet material in the partially expanded state.

13. The dunnage conversion machine according to claim 6, further comprising a cutting device mounted in the dunnage conversion machine downstream of the relaxation rollers, the cutting device being configured to cut the dunnage pad after a desired length has been formed.

14. A system for producing a dunnage pad from a slit-sheet material having a plurality of rows of slits extending across a width dimension of the sheet with adjacent rows laterally offset, the system comprising:
    the dunnage conversion machine according to claim 6;
    a controller configured to maintain the first rotational speed, the second rotational speed, and the third rotational speed; and
    a supply of sheet stock material for delivery to the dunnage conversion machine and formation of the dunnage pad.

15. The system according to claim 14, wherein the supply of sheet stock material includes:
    a supply of slit-sheet material for delivery of the slit-sheet material in the unexpanded state between the pair of gripping rollers; and
    a supply of cover sheet material for delivery of the cover sheet between the pair of relaxing rollers.

16. The system according to claim 15, wherein the supply of slit-sheet material and the supply of cover sheet material are provided in the form of a roll.

17. The system according to claim 14, wherein at least one of the slit-sheet material and the cover sheet material are made of paper.

18. The system according to claim 14, wherein at least one of the slit-sheet material and the cover sheet material are made of kraft paper.

19. A method for producing a dunnage pad from a slit-sheet material having a plurality of rows of slits extending across a width dimension of the sheet with adjacent rows laterally offset, the method comprising the steps of:
advancing the slit-sheet material in an unexpanded state from a supply in a downstream direction transverse the width dimension at a first rate, wherein the advancing step includes feeding the slit-sheet material in an unexpanded state between a pair of gripping rollers rotating at a first rotational speed to advance the slit-sheet material in a downstream direction;
creating tension in the slit-sheet material transverse the width dimension to cause the slits to open to a fully-expanded state, wherein the creating step includes expanding the slit-sheet material to a fully expanded state by drawing the slit-sheet material between a pair of expansion rollers rotating at a second rotational speed, the second rotational speed being faster than the first rotational speed to create a stretching force on the slit-sheet material in a region between the gripping rollers and the expansion rollers and to further advance the slit-sheet material in the downstream direction as it expands to the fully expanded state; and
reducing the tension in the slit-sheet material after the creating step to cause the slits to relax from the fully-expanded state to a partially-expanded state, wherein the reducing step includes relaxing the slit-sheet material to a partially expanded state by drawing the slit-sheet material between a pair of relaxation rollers rotating at a third rotational speed, the third rotational speed being slower than the second rotational speed to reduce the stretching force on the slit-sheet material in a region between the expansion rollers and the relaxation rollers and to further advance the slit-sheet material in the downstream direction while the reduction of stretching force causes relaxation of the slit-sheet material to the partially expanded state;
connecting the slit-sheet material in the partially-expanded state to at least one cover sheet to form a dunnage pad, wherein the connecting step includes capturing the slit-sheet material in the partially expanded state between a top cover sheet and a bottom cover sheet to form the dunnage pad.

20. The method as set forth in claim 19, further comprising the step of cutting the dunnage pad after a desired length of dunnage pad has been formed.

* * * * *